United States Patent
Kalippke et al.

[11] Patent Number: 5,275,373
[45] Date of Patent: Jan. 4, 1994

[54] ROTARY ACTUATOR

[75] Inventors: Harald Kalippke, Benningen; Friedrich Wendel, Weissach; Erhard Renninger; Johannes Meiwes, both of Markgroeningen; Dieter Dick, Muehlacker, all of Fed. Rep. of Germany

[73] Assignee: Robert Bosch GmbH, Stuttgart, Fed. Rep. of Germany

[21] Appl. No.: 930,397

[22] PCT Filed: Feb. 16, 1991

[86] PCT No.: PCT/DE91/00123
§ 371 Date: Sep. 8, 1992
§ 102(e) Date: Sep. 8, 1992

[87] PCT Pub. No.: WO91/14090
PCT Pub. Date: Sep. 19, 1991

[30] Foreign Application Priority Data
Mar. 8, 1990 [DE] Fed. Rep. of Germany ....... 4007260

[51] Int. Cl.⁵ .................... F16K 5/10; F02M 3/07
[52] U.S. Cl. ...................... 251/208; 251/209
[58] Field of Search ............ 251/208, 209, 129.12

[56] References Cited

U.S. PATENT DOCUMENTS

| 2,449,833 | 9/1948 | Barnes . | |
|---|---|---|---|
| 4,934,604 | 6/1990 | Oskamp | 251/209 X |
| 4,962,737 | 10/1990 | Brand et al. . | |
| 4,989,833 | 2/1991 | Polon | 251/208 X |

FOREIGN PATENT DOCUMENTS

WO88/09434 12/1988 World Int. Prop. O. .

*Primary Examiner*—Arnold Rosenthal
*Attorney, Agent, or Firm*—Michael J. Striker

[57] ABSTRACT

A device, in particular for controlling a throttle cross-section in an operating fluid carrying line of an internal combustion engine, has a housing provided with a bore and a throttle aperture, an inlet connecting piece associated with the housing, a rotary valve acting as a throttling organ and being centrally arranged so as to be rotatable in the housing and closing the throttle aperture to a greater or a lesser extent, so that a fluid to be controlled passes through the inlet connection piece directly via the throttle opening. The rotary valve has a shaft with an axis, and also has a control edge and a rear edge which is opposite to the control edge. The control edge and the rear edge both extend obliquely relative to the axis of the shaft of the rotary valve.

6 Claims, 3 Drawing Sheets

ROTARY ACTUATOR

BACKGROUND OF THE INVENTION

The present invention relates to a rotary actuator. More particularly, it relates to a rotary actuator for controlling a throttle cross-section in an operating fluid carrying line of an internal combustion engine, with a housing and an actuating motor which drives a rotary valve acting on a throttling organ.

Rotary actuators of the above mentioned general type are known in the art. From the DE-GM 88 90 3181, such a rotary actuator is already known, which due to the forming of vortexes can however cause whistling noises, and its control behavior can be influenced by pulses of air turbulence occurring on its rotary valve.

SUMMARY OF THE INVENTION

Accordingly, it is an object of the present invention to provide a rotary actuator of the above mentioned type, which avoids the disadvantages of the prior art.

In keeping with these objects and with others which will become apparent hereinafter, one feature of the present invention resides, briefly stated, in a rotary actuator in which the rotary valve has a control edge and opposite this, a rear edge both of which extend obliquely relative to an axis of a shaft of the rotary valve.

When the rotary actuator is designed in accordance with the present invention, it has the advantage that on flowing through the disc valve, disturbing noises are avoided and air turbulences do not occur. Moreover, the air turbulences reduce to a small amount of the size of bearing friction.

It is of particular advantage that the throttle opening, which is configured as an oblique window, has limits which extend obliquely in relation to the shaft axis. Due to both the output and the input connection piece being arranged at the side of the rotary actuator shaft, in particular such that the flow is guided approximately tangentially past the rotary disc valve shaft, the formation of vortexes in the valve housing is reduced, which has the additional effect of reducing noise.

In accordance with another embodiment of the present invention, the rotary actuator has limiting edges of the throttle aperture which are allocated at the edges of the rotary valve and extend obliquely relative to the axis of the shaft of the rotary valve.

Still another feature of the rotary actuator is that the axis of an input connection piece which is arranged on the rotary valve housing also moves laterally past the shaft of the rotary valve.

In accordance with another feature of the present invention the throttle aperture can have the shape of a parallelogram or a rectangle.

Finally, the rotary valve can be adjusted from its rear position in either direction of rotation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
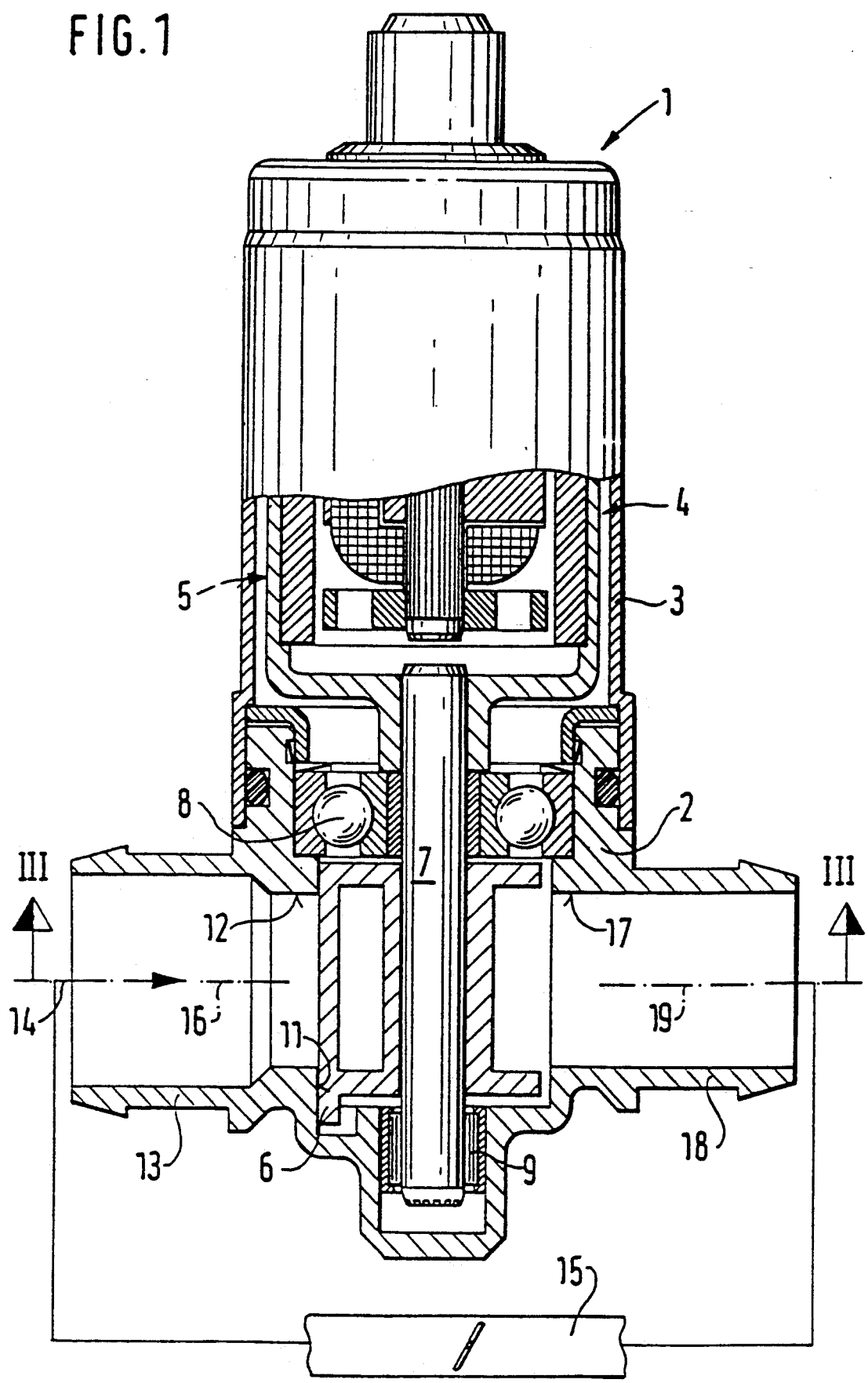
FIG. 1 shows a longitudinal section through a rotary actuator.

A rotary actuator 1 for regulating the idle combustion air of an internal combustion engine has a rotary valve housing 2 with housing cap 3, within which an actuating motor 4 is accommodated. The actuating motor 4 has a rotor 5 acting on a rotary valve which serves as a throttle. The rotary valve 6 is connected to the rotor 5 via a shaft 7 which is supported in two anti-friction bearings 8, 9. The rotary valve 6 rests in a bore 11 which is arranged parallel with the shaft 7 in the housing 2. In the region of the rotary valve 6, the housing 2 has at its side a throttle aperture 12 which terminates in the bore 11 and which is connected to an input connection piece 13 for the purpose of connecting a bypass line 14. The bypass line 14 leads to an induction pipe 15 with a throttle valve, for the control of the volume of combustion air to the internal combustion engine. The input connection piece 14 is located at right angles to the shaft 7, but its axis 16 is offset such that it extends past the side of shaft 7 of the rotary valve 6 and does not cut it. In the wall area opposite the throttle aperture 12, the bore 11 has an outlet opening 17, which in relation to the throttle aperture 12 has a larger cross-section and which is connected to an outlet connection piece 18. The axis 19 of the output connection piece 18 is located like that of the input connection piece 16, vertically in relation to the shaft 7, but laterally offset. The axes 16 and 19 are on the same center line.

Figure 2:
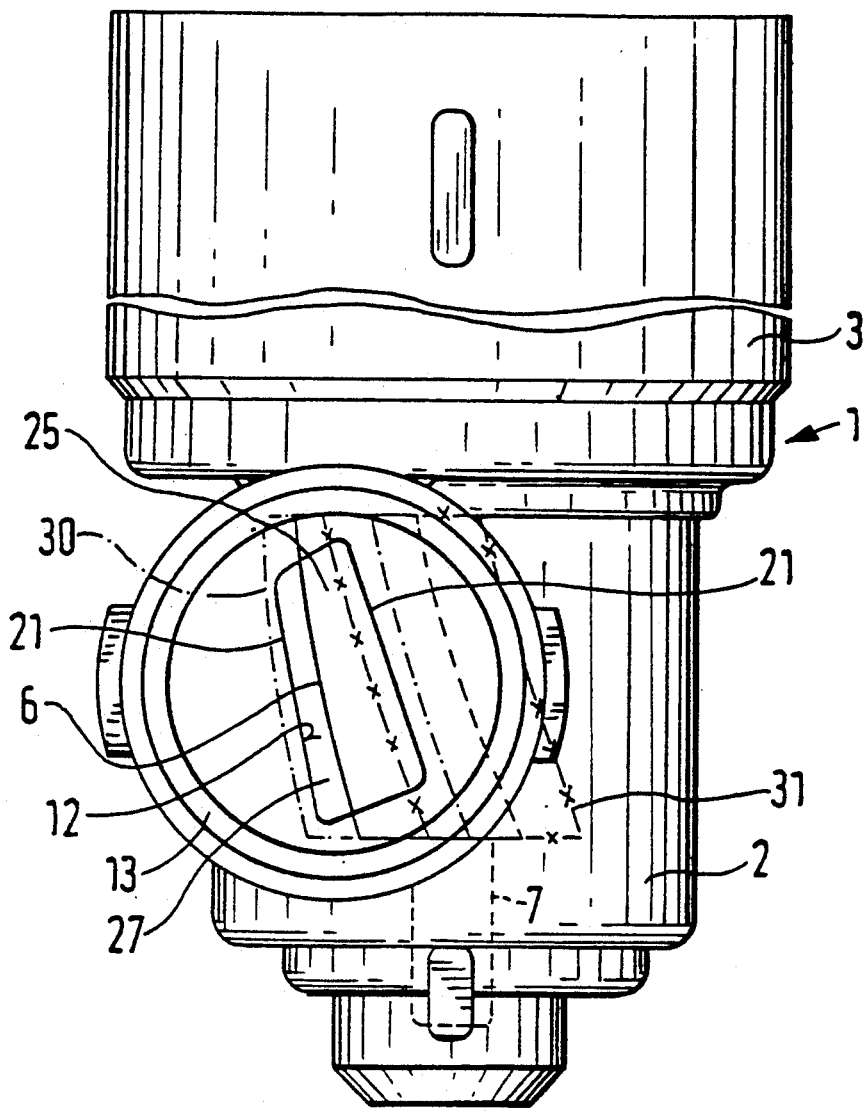
FIG. 2 shows a view of the input connection piece of the rotary actuator.
Figure 4:
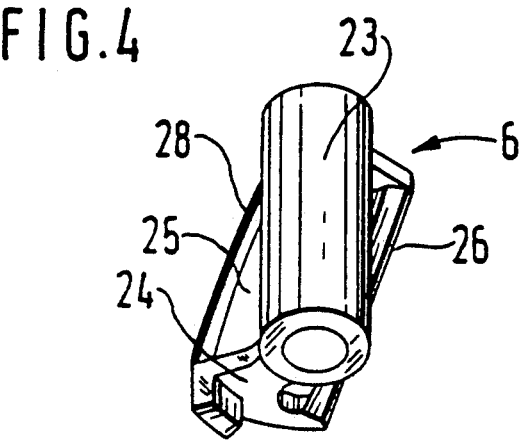
FIG. 4 shows a rotary actuator in perspective.

As shown in FIG. 2, the throttle aperture 12 has a rectangular shape. The longer limiting edges 21 of the throttle opening 12 are at an acute angle obliquely in relation to the axis of the shaft 7. Alternatively, the throttle aperture may be in the shape of a parallelogram, so that the longer limiting edges are again arranged obliquely in relation to the axis of the shaft 7 and the shorter edges approximately at right angles to it. The rotary valve 6 consists of a sleeve 23 which is connected to the shaft 7 and on which a closing element 25 is fixed via two arms 24. The closing element is designed as a parallelogram shaped cutout of a cylindrical surface. The closing element has a front control edge 26, which sweeps the throttle aperture 12 to a greater or lesser extent and thereby determines the size of the opening gap 27 of the throttle aperture 12. The sharp edged control edge 26 extends like the limiting edges 21 of the throttle aperture 12, at an acute angle in relation to the axis of shaft 7. The rear edge 28 of the rotary valve 6 which lies opposite the control edge 26, similarly extends obliquely relative to the axis of shaft 7. The limiting edges 21 of the throttle aperture 12, and the control edge 26 and the rear edge 28 of the rotary valve 6 are inclined to the same side, opposite the axis of the shaft 7.

FIG. 2 shows the rotary valve 6 in its stationary position which it assumes when the actuating motor 4 is not energized. To regulate the idle air volume, the throttle aperture 12 can be completely closed by rotating the rotary valve 6 clockwise (position 30 of the closing element shown by a dot-dash line). Rotation in anti-clockwise direction will open the throttle aperture further (position 31 of the closing element shown in a dash-cross line). The opening gap 27 is obliquely arranged relative to the bore 11 and to the axis of the shaft 7 at any rotational position of the rotary valve 6. The oblique position of the throttle opening limiting edges 21 and of the edges 26, 28 of the closing element 25 is matched to the thickness of the shaft 7 or of the sleeve 23 in order to minimize whistling noise and air turbulence pulses. The rear oblique edge 28 in particular counteracts the forming of a vortex in that part of the bore 11 through which there is no direct flow. The two constructions of the throttle aperture 12 have the following additional effects: the obliquely lying rectangular aperture has a slightly enlarged setting angle and with leakage air which is unchanged relative to the state of technology; the parallelogram shaped throttle aperture has an unchanged setting angle, but slightly increased leakage air.

Figure 3:
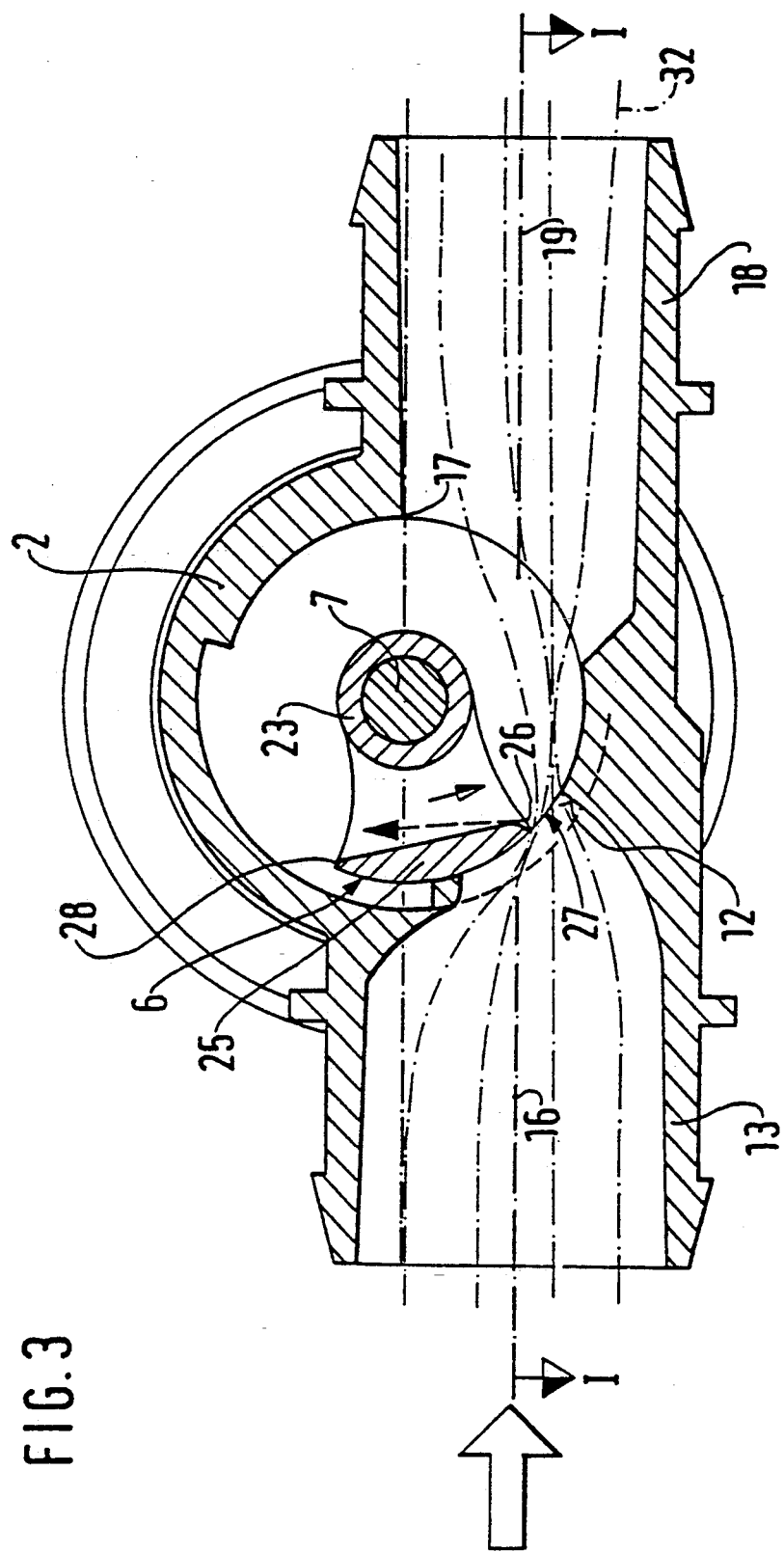
FIG. 3 shows a section in accordance with line III—III in FIG. 1.

During operation of the rotary actuator 1, the actuating motor 4 receives a signal for the rotary setting of the rotor 5 from a control unit of the internal combustion engine. Corresponding to this rotary setting, the closing element 25 is then in relation to the throttle opening 12. Depending on the size of the developing opening gap 27, a greater or lesser air volume now flows through the input connection piece 13 into the rotary valve housing 2. The dot-dash flow lines 32 in FIG. 3 show that the lateral offset of the axes 16 and 19 of input and output connection pieces 13 and 18 opposite shaft 7 result in a vortex-free throughflow of the rotary actuator housing 2, which depending on the throttle setting is restricted to a greater or lesser extent, but is otherwise largely in a straight line. The flow moves laterally past the shaft 7 to the output connection piece 18. The vortex-free throughflow is promoted by the arrangement of the throttle aperture 12 on the input connection piece 13 and an outlet opening 17 which has a larger cross-section relative to the latter; this effect would not be achieved if the throttle opening were arranged on the outlet connection piece.

It will be understood that each of the elements described above, or two or more together, may also find a useful application in other types of constructions differing from the types described above.

While the invention has been illustrated and described as embodied in a rotary actuator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for controlling a throttle cross-section in an operating fluid carrying line of an internal combustion engine, the device comprising an actuating motor; a housing provided with a bore and a throttle aperture and also with an input connecting piece and an output connecting piece; and a rotary valve driven by said actuating motor and centrally arranged so as to be rotatable in said housing and closing said throttle aperture to a greater or a lesser extent, so that a fluid to be controlled passes through said input connection piece directly via said throttle aperture into said bore and out again through said output connection piece, said rotary valve having a shaft with an axis, said rotary valve also having a control edge and a rear edge which is opposite to said control edge, said control edge and said rear edge both extending obliquely relative to said axis of said shaft of said rotary valve, said output connection piece and said input connection piece when viewed in direction along said shaft terminating laterally in relation to said shaft into said bore, so that the flow is moved approximately tangentially past said shaft.

2. A device as defined in claim 1, wherein said throttle aperture has limiting edges, said limiting edges being allocated to said control edge and said rear edge of said rotary valve and extending obliquely relative to said axis of said shaft of said rotary valve.

3. A device as defined in claim 1, wherein said output connection piece is arranged relative to said housing so that it extends laterally with regard to said shaft of said rotary valve, said input connection piece being arranged on said rotary valve housing and having an axis which also extends laterally with regard to said shaft of said rotary valve.

4. A device as defined in claim 1, wherein said throttle aperture has the shape of a parallelogram.

5. A device as defined in claim 1, wherein said throttle aperture has the shape of a rectangle.

6. A device as defined in claim 1, wherein said rotary valve is adjustable from its rest position in either direction of rotation.

* * * * *